United States Patent
O'Konski et al.

(10) Patent No.: US 10,672,423 B2
(45) Date of Patent: Jun. 2, 2020

(54) ELECTRONIC TEST STRUCTURES FOR ONE OR MORE MAGNETORESISTIVE ELEMENTS, AND RELATED METHODS

(71) Applicant: Seagate Technology LLC, Cupertino, CA (US)

(72) Inventors: Jeff R. O'Konski, Savage, MN (US); Andrew David Habermas, Bloomington, MN (US); Charles J. Mann, Plymouth, MN (US); Greg A. Schmitz, Princeton, MN (US)

(73) Assignee: Seagate Technology LLC, Cupertino, CA (US)

( * ) Notice: Subject to any disclaimer, the term of this patent is extended or adjusted under 35 U.S.C. 154(b) by 60 days.

(21) Appl. No.: 15/949,192

(22) Filed: Apr. 10, 2018

(65) Prior Publication Data
US 2019/0311733 A1    Oct. 10, 2019

(51) Int. Cl.
*G11B 5/455* (2006.01)
*G11B 5/39* (2006.01)

(52) U.S. Cl.
CPC ............ *G11B 5/455* (2013.01); *G11B 5/3903* (2013.01)

(58) Field of Classification Search
None
See application file for complete search history.

(56) References Cited

U.S. PATENT DOCUMENTS

| | | |
|---|---|---|
| 5,095,613 A | 3/1992 | Hussinger et al. |
| 6,083,081 A * | 7/2000 | Fukuroi ............ B24B 37/04 29/603.07 |
| 6,370,763 B1 | 4/2002 | Watanuki et al. |
| 7,551,406 B1 | 6/2009 | Thomas et al. |
| 7,643,250 B2 | 1/2010 | Araki et al. |
| 7,861,400 B2 | 1/2011 | Lille |
| 8,165,709 B1 | 4/2012 | Rudy |
| 8,427,925 B2 | 4/2013 | Zhao et al. |
| 8,937,852 B2 | 1/2015 | Rivkin et al. |
| 9,019,659 B1 | 4/2015 | Yin et al. |
| 9,171,557 B1 | 10/2015 | Qiu et al. |
| 2006/0168798 A1 | 8/2006 | Naka |
| 2010/0162556 A1 | 7/2010 | Guruz et al. |
| 2010/0208391 A1 | 8/2010 | Gokemeijer |

OTHER PUBLICATIONS

Four point probe, Method of operation, retrieved from http://lnf-wiki.eecs.umich.edu/wiki/four_point_probe, 2 pages.

* cited by examiner

*Primary Examiner* — Jas A Sanghera
(74) *Attorney, Agent, or Firm* — Kagan Binder, PLLC

(57) ABSTRACT

The present disclosure involves electronic test structures, and related methods, for use with one or more magnetoresistive elements at least at the wafer stage of slider manufacturing.

14 Claims, 11 Drawing Sheets

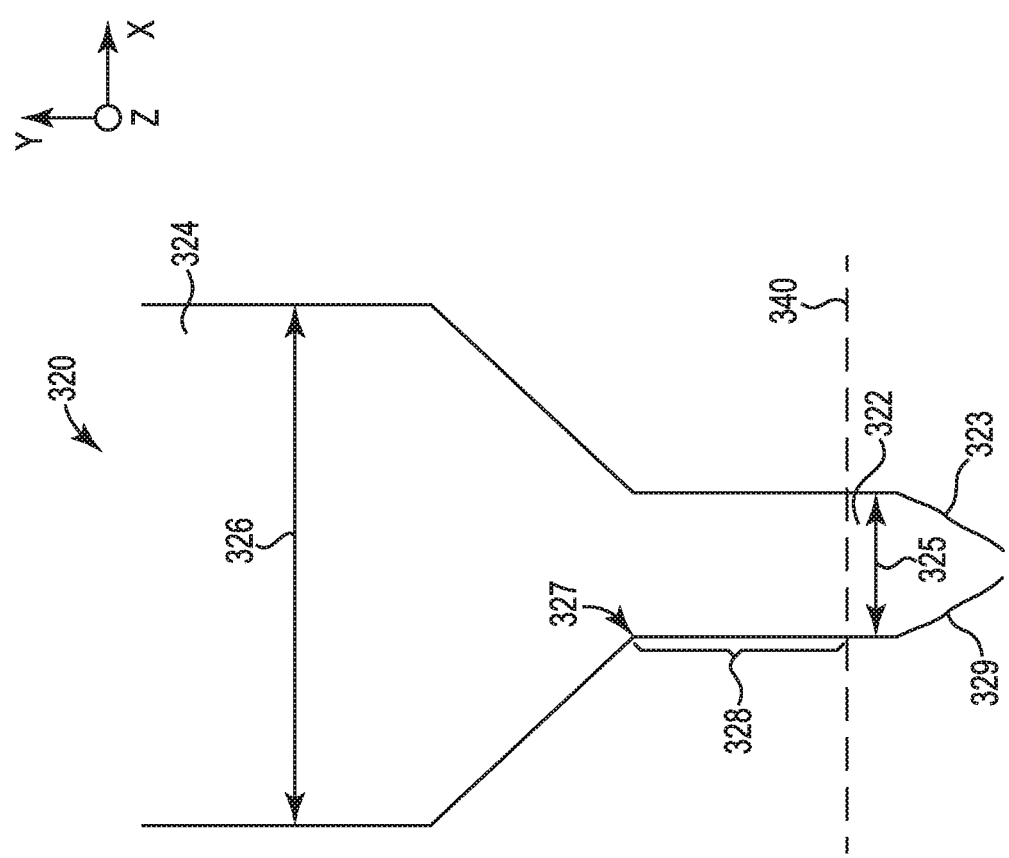

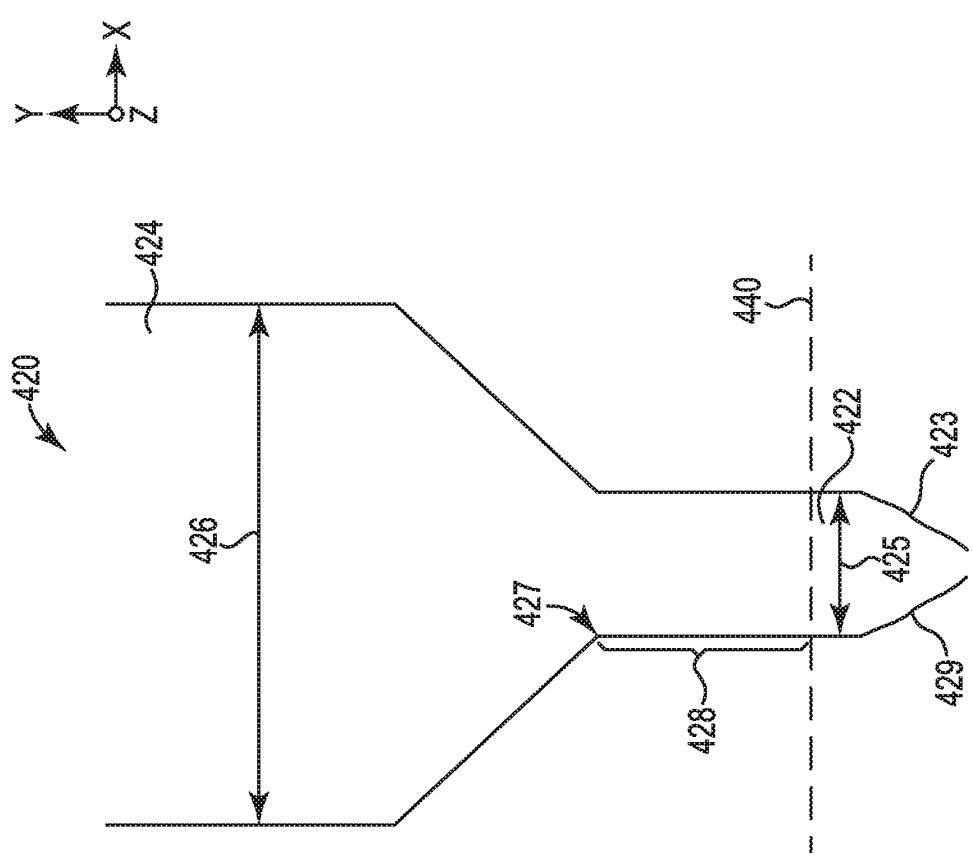

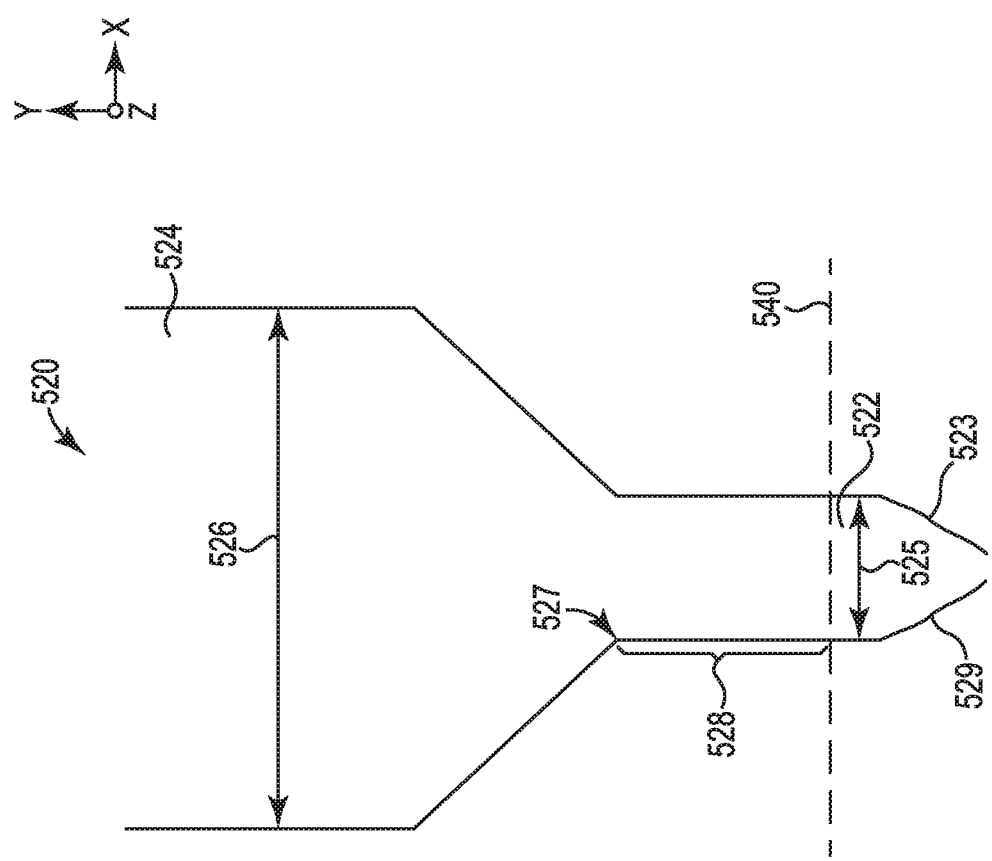

ELECTRONIC TEST STRUCTURES FOR ONE OR MORE MAGNETORESISTIVE ELEMENTS, AND RELATED METHODS

BACKGROUND

The present disclosure involves electronic test structures, and related methods, for use with one or more magnetoresistive elements at least at the wafer stage of slider manufacturing.

SUMMARY

Embodiments of the present disclosure include a method of forming an electronic test structure, wherein the method comprises:
 a) forming at least one magnetoresistive element on a wafer, wherein a target air bearing surface is perpendicular to and intersects the magnetoresistive element, wherein the magnetoresistive element has a width dimension that is parallel to the target air bearing surface,
 b) forming an electronic test structure on the wafer, wherein the electronic test structure comprises:
  i) at least one reference magnetoresistive element, wherein a first reference air bearing surface is perpendicular to and intersects the reference magnetoresistive element, and wherein the reference magnetoresistive element has a width dimension that is parallel to the first reference air bearing surface,
  ii) at least one pair of electrical leads, wherein the pair of electrical leads comprises a first electrical lead and a second electrical lead, wherein the first electrical lead extends at least across the width dimension of a first region in the reference magnetoresistive element, wherein the first electrical lead physically and electrically contacts the first region in the reference magnetoresistive element, wherein the second electrical lead extends at least across the width dimension of a second region in the reference magnetoresistive element, wherein the second electrical lead physically and electrically contacts the second region, and wherein the second electrical lead has an edge that represents the first reference air bearing surface.

Embodiments of the present disclosure also include a wafer having:
 a) at least one magnetoresistive element, wherein the magnetoresistive element includes a first region and a second region, wherein a target air bearing surface is perpendicular to and intersects the write pole region, wherein the first region has a width dimension that is parallel to the target air bearing surface, and wherein the second region has a width dimension that is parallel to the target air bearing surface; and
 b) an electronic test structure, wherein the electronic test structure includes:
  i) at least one reference magnetoresistive element, wherein the at least one reference magnetoresistive element includes a first region and a second region, wherein a first reference air bearing surface is perpendicular to and intersects the first region, wherein the first region has a width dimension that is parallel to the first reference air bearing surface, and wherein the second region has a width dimension that is parallel to the first reference air bearing surface; and
  ii) at least one pair of electrical leads, wherein the pair of electrical leads includes a first electrical lead and a second electrical lead, wherein the first electrical lead extends at least across the width dimension of the second region in the reference magnetoresistive element, wherein the first electrical lead physically and electrically contacts the second region in the reference magnetoresistive element, wherein the second electrical lead extends at least across the width dimension of the first region in the reference magnetoresistive element, wherein the second electrical lead physically and electrically contacts the first region, and wherein the second electrical lead has an edge that represents the first reference air bearing surface.

Embodiments of the present disclosure also include a method of forming an electronic write pole test structure, wherein the method includes:
 a) forming at least one magnetic write head on a wafer, wherein the write head includes a write pole region and a yoke region, wherein a target air bearing surface is perpendicular to and intersects the write pole region, wherein the write pole region has a width dimension that is parallel to the target air bearing surface, and wherein the yoke region has a width dimension that is parallel to the target air bearing surface;
 b) forming an electronic write pole test structure on the wafer, wherein the electronic write pole test structure includes:
  i) at least one reference magnetic write head, wherein the at least one reference magnetic write head includes a write pole region and a yoke region, wherein a first reference air bearing surface is perpendicular to and intersects the write pole region, wherein the write pole region has a width dimension that is parallel to the first reference air bearing surface, and wherein the yoke region has a width dimension that is parallel to the first reference air bearing surface; and
  ii) at least one pair of electrical leads, wherein the pair of electrical leads includes a first electrical lead and a second electrical lead, wherein the first electrical lead extends at least across the width dimension of the yoke region in the reference magnetic write head, wherein the first electrical lead physically and electrically contacts the yoke region in the reference magnetic write head, wherein the second electrical lead extends at least across the width dimension of the write pole region in the reference magnetic write head, wherein the second electrical lead physically and electrically contacts the write pole region, and wherein the second electrical lead has an edge that represents the first reference air bearing surface.

Embodiments of the present disclosure also include a wafer having:
 a) at least one magnetic write head, wherein the write head includes a write pole region and a yoke region, wherein a target air bearing surface is perpendicular to and intersects the write pole region, wherein the write pole region has a width dimension that is parallel to the target air bearing surface, and wherein the yoke region has a width dimension that is parallel to the target air bearing surface; and
 b) an electronic write pole test structure, wherein the electronic write pole test structure includes:
  i) at least one reference magnetic write head, wherein the at least one reference magnetic write head includes a write pole region and a yoke region, wherein a first reference air bearing surface is perpendicular to and intersects the write pole region, wherein the write pole region has a width dimension that is parallel to the first reference air bearing surface, and wherein the yoke region has a width dimension that is parallel to the first reference air bearing surface; and ii) at least one pair of electrical leads, wherein the pair of electrical leads includes a first electrical lead and a second electrical lead, wherein the first electrical lead extends at least across the width dimension of the yoke region in the reference magnetic write head, wherein the first electrical lead physically and electrically contacts the yoke region in the reference magnetic write head, wherein the second electrical lead extends at least across the width dimension of the write pole region in the reference magnetic write head, wherein the second electrical lead physically and electrically contacts the write pole region, and wherein the second electrical lead has an edge that represents the first reference air bearing surface.

BRIEF DESCRIPTION OF THE DRAWINGS

FIG. 3B is a schematic, cross-section of a portion of the embodiment shown in FIG. 3A;

FIG. 4B is a schematic, cross-section of a portion of the embodiment shown in FIG. 4A;

FIG. 5B is a schematic, cross-section of a portion of the embodiment shown in FIG. 5A.

DETAILED DESCRIPTION

Figure 1:
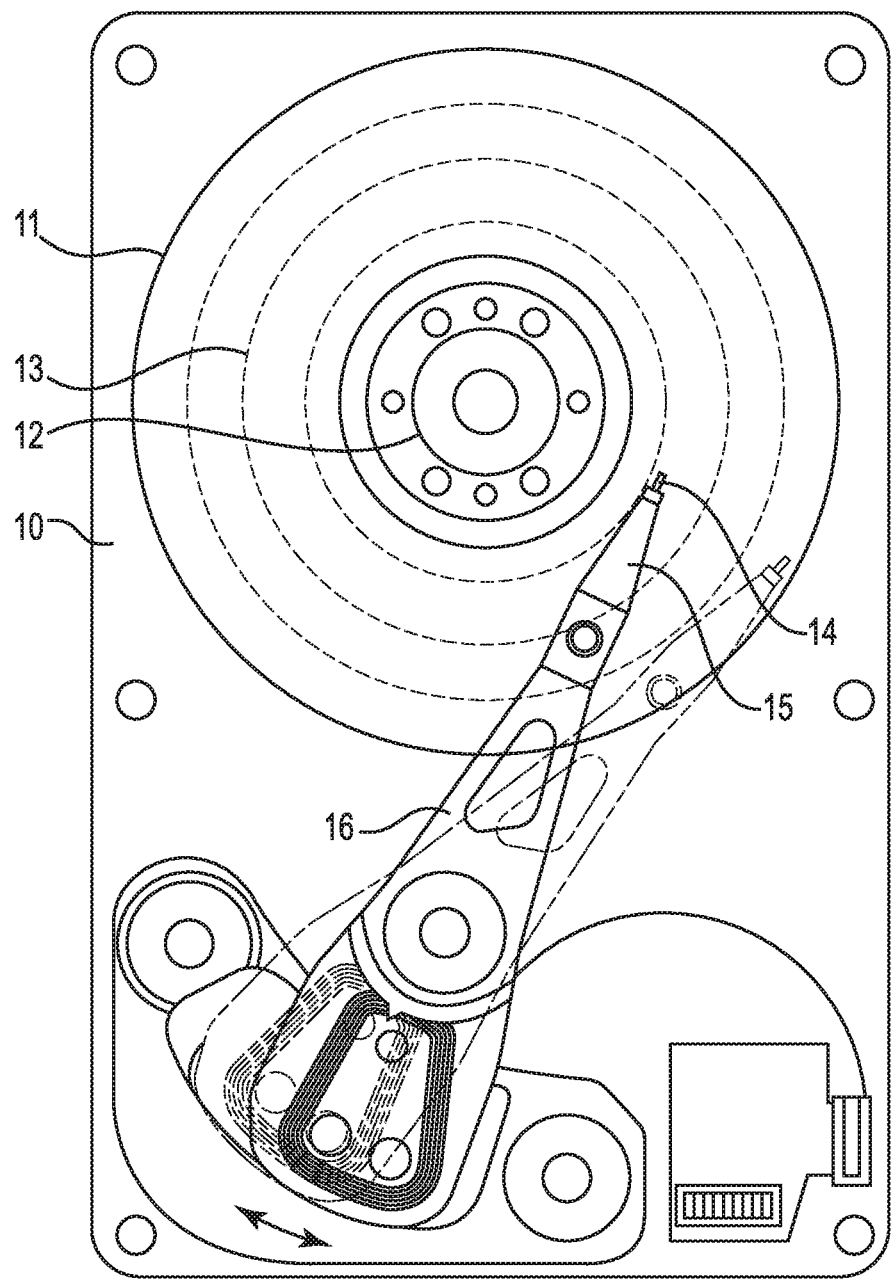
FIG. 1 shows a top view of a hard disc drive with the cover removed.

A magnetic recording apparatus is shown in FIG. 1. The apparatus 10 can be referred to as a hard disk drive (HDD) and includes a slider 14 that flies above a disk 11 by using air as a lubricant. Referring to FIG. 1, a disk 11 is placed on a spindle motor 12 that can rotate and a negative pressure air-lubricated bearing slider 14 is attached at a suspension 15 to correspond to the magnetic disk 11. The negative pressure air-lubricated bearing slider 14 can be moved (as indicated by the arrow and dashed lines) by an actuator 16 which pivots so that the slider 14 moves to a desired position on a track 13 of the disk 11. As shown, the disk 11 used as a recording medium has a circular shape and different information can be recorded on each track 13. In general, to obtain desired information, the slider 14 moves in search of a corresponding track on the disk 11.

Figure 2:
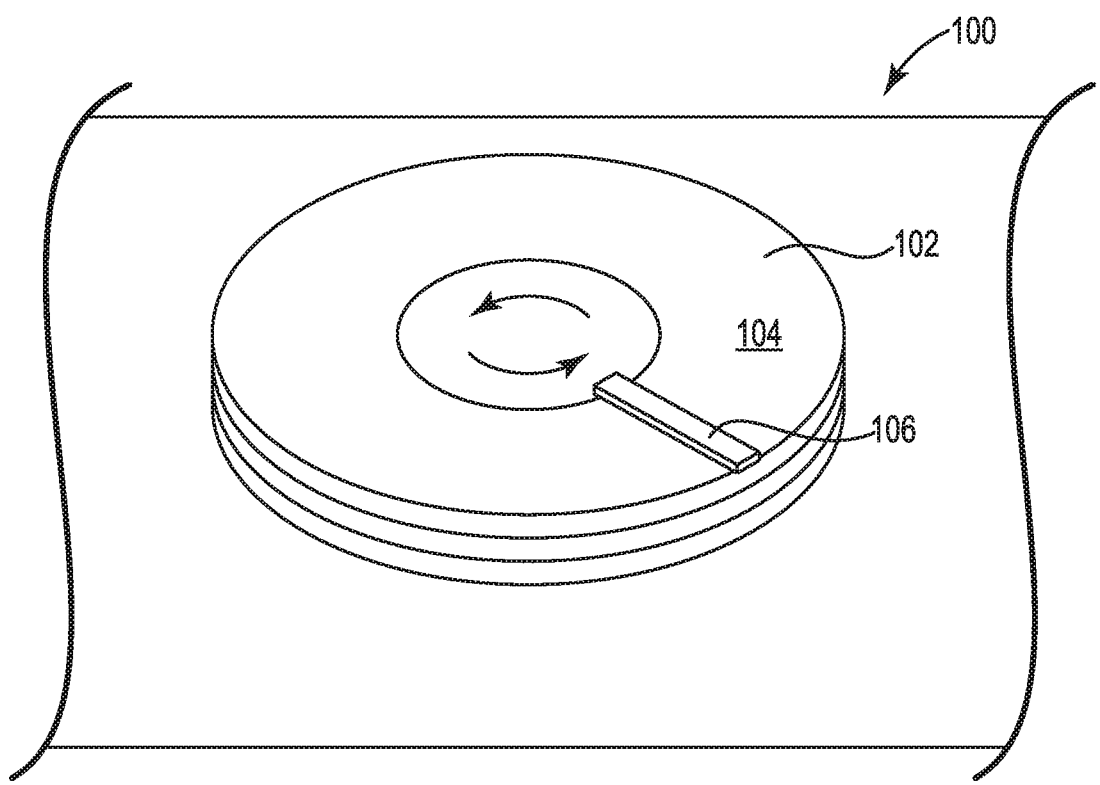
FIG. 2 is a schematic perspective view showing a lapping plate in a portion of a lapping tool.

FIG. 2 diagrammatically depicts a lapping tool 100 used for machining a surface of a row bar that can be later sliced into a plurality of individual sliders such as slider 14. The tool 100 has a rotating lapping plate 102 defining a lapping surface 104 which can help abrase the surface of a ceramic material such as AlTiC. If desired, a slurry can be applied to the lapping surface 104 to enhance the abrasing action as the lapping surface 104 is rotated relative to a row bar 106 containing a plurality of the sliders held in a pressing engagement against the lapping surface 104. Lapping a row bar of sliders permits multiple slider bodies to be processed together, which can advantageously be relatively simple, precise and/or cost-effective. Lapping can involve multiple lapping steps such as rough lapping, final (kiss) lapping, and the like. At a desired point in manufacturing, individual sliders can be sliced from the row bar and ultimately used in a hard disk drive. In some embodiments, a row bar can include a plurality of slider bodies. In some embodiments, a row bar can include at least 30 slider bodies, at least 60 slider bodies, or even at least 70 slider bodies.

Row bars of sliders can be prepared from wafers. The present disclosure involves electronic test structures, and related methods, for use with magnetoresistive elements when measured during wafer manufacturing stage and/or measured or used for slider manufacturing. As described below, the present disclosure relates to electronic test structures for magnetoresistive elements that are used to obtain data about individual magnetoresistive elements at the wafer stage of manufacturing so that data can be used during lapping of row bars.

As used herein, "magnetoresistive elements" refers elements used in the transducer region of a data storage device such as a hard disk drive. Examples of magnetoresistive elements that the electronic test structures of the present disclosure can be used include write heads, readers, near field transducers, and the like. For illustration purposes, an example of measuring the resistance through an electronic test structure according to the present disclosure is described herein below with respect to a write pole test structure, using an electrical lead to represent the air bearing surface.

Figure 3A:
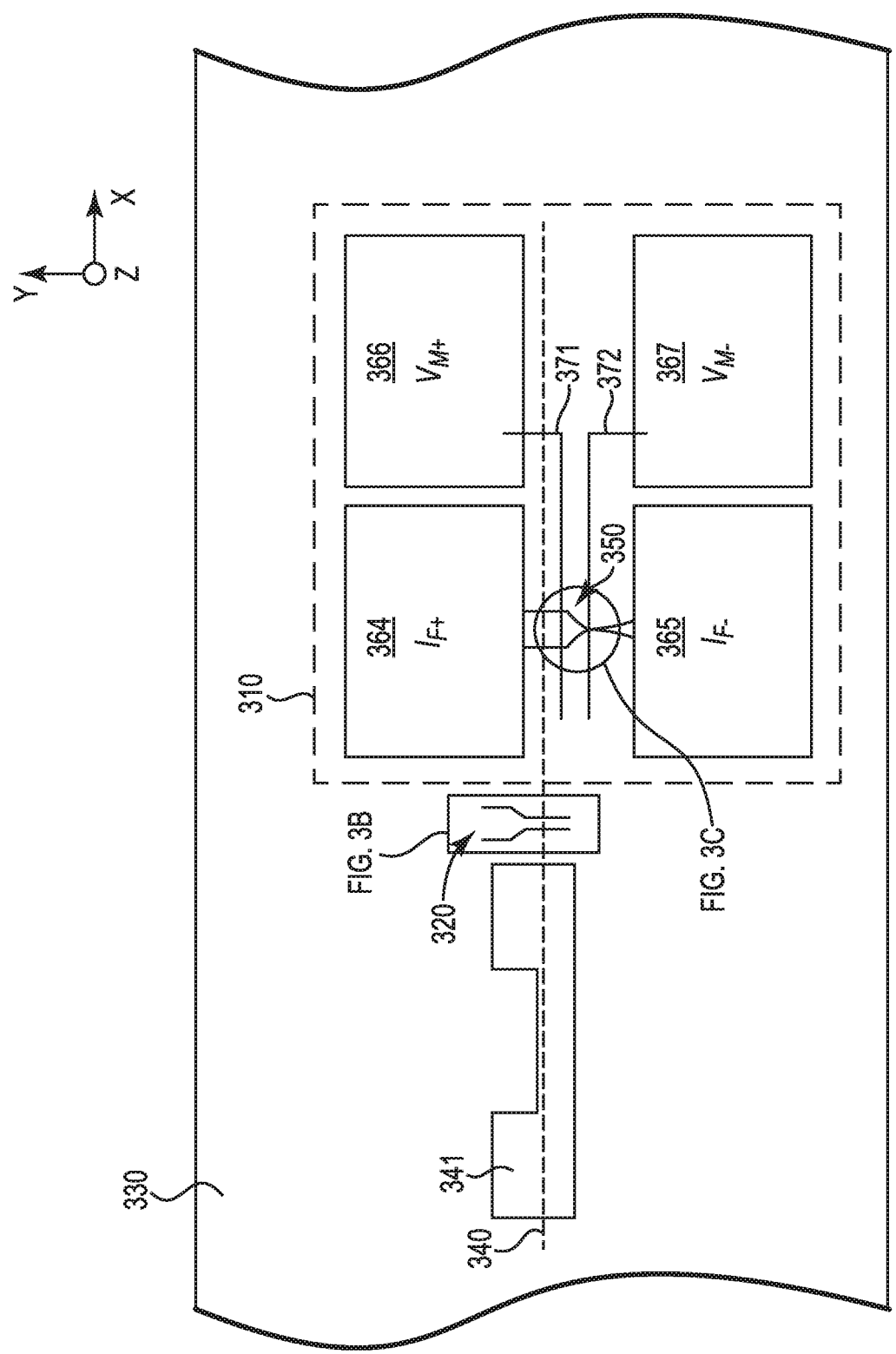
FIG. 3A is a schematic, cross-section of an embodiment of a portion of a wafer that includes an electronic write head test structure according to the present disclosure.
Figure 3C:
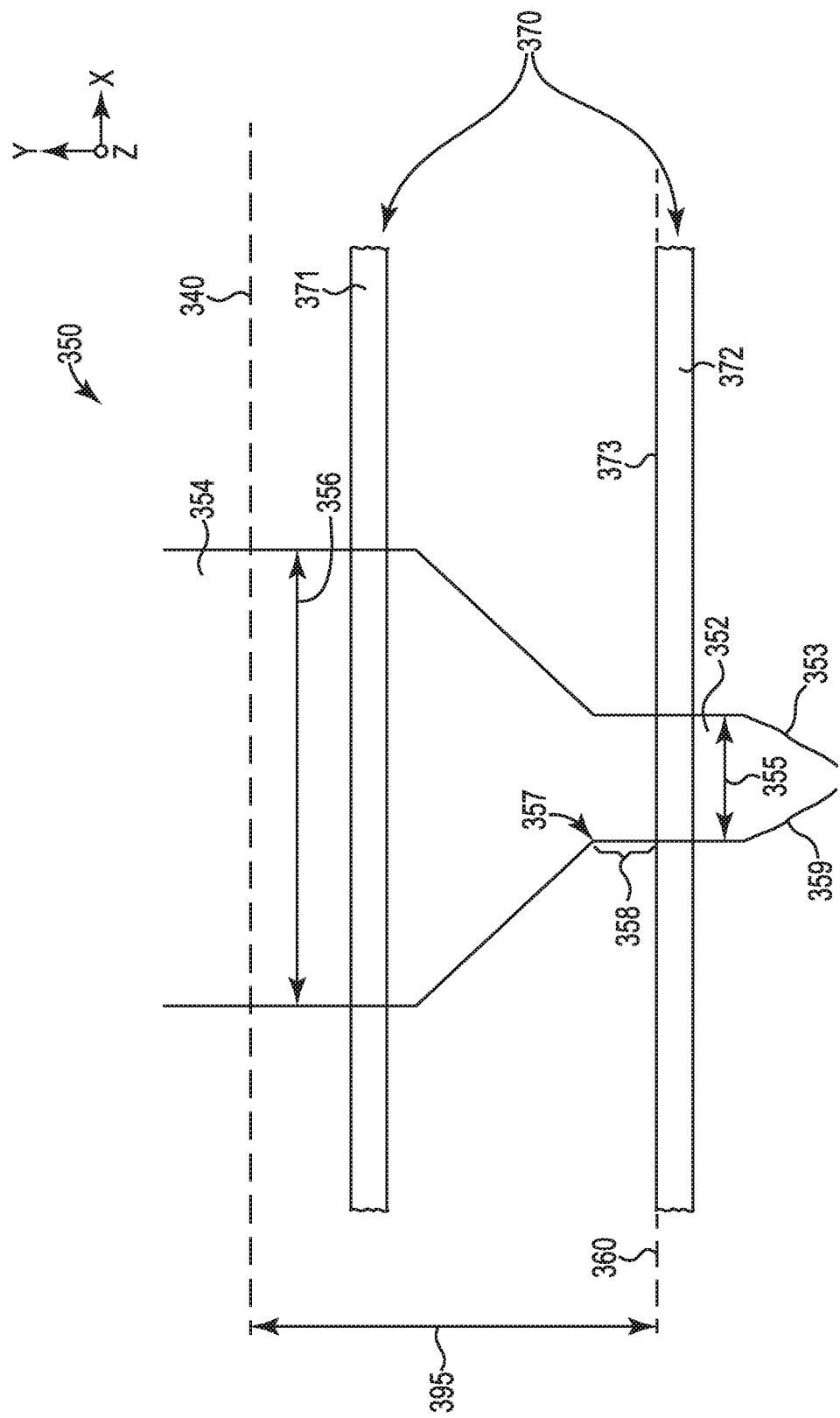
FIG. 3C is a schematic, cross-section of a portion of the embodiment shown in FIG. 3A.

FIGS. 3A, 3B, and 3C are schematic illustrations of a portion of a wafer 330 that includes a plurality of write heads 320 that will eventually be made into individual transducer heads for use in a hard disc drive. It is noted that wafer 330 can include one or more additional features associated with read/write operations such as read heads, near-field transducers, and the like. These features are omitted for illustration purposes. According to the present disclosure, at least one write head 320 is associated with at least one electronic write pole test structure 310, which can be used to determine width information about the write pole region 322 for use in subsequent lapping operation(s).

As shown in FIGS. 3A and 3B, the wafer 330 is oriented so that the "y" axis can be referred to as the lapping direction. Accordingly, the write pole region 322 can be lapped from the bottom up as material is removed during lapping. Wafer 330 is also oriented so that the "x" axis can be referred to the cross-track axis, which corresponds to the direction along the trailing edge of an individual slider. Finally, the "z" axis (into the figure) can be referred to as the downtrack axis, which corresponds to the direction from the leading edge to the trailing edge of an individual slider and is perpendicular to the cross-track ("x") axis.

As shown in FIG. 3A, the wafer 330 includes an electronic lapping guide 341, a magnetic write head 320, and an electronic write pole test structure 310.

A wafer 330 can be made out of a variety of materials including alumina, alumina-titanium-carbide (AlTiC), nickel-iron (NiFe), copper, gold, combinations of these, and the like. A plurality of individual sliders can be manufactured from a single wafer. During slider manufacturing, a wafer can be processed using one or more (often very many) wafer lithography and etching steps.

An electronic lapping guide (ELG) 341 has an electrical resistance that can change as conditions change. For example, the electrical resistance of an ELG can increase as ELG material is removed during a lapping process and thus may be used to monitor lapping of the air bearing surface side during slider manufacturing. Accordingly, an ELG may be formed in the wafer stage and the ELG resistance may be monitored during lapping. The resistance of an ELG can be correlated to material removed from an element that the ELG is associated with such as a magnetic reader, magnetic write head, near-field transducer, etc. Thus, the ELG can be used to target a desired dimension of an element such as magnetic write head 320. For example, an ELG can be used during lapping to target a break point for a magnetic write head. ELGs are also described in U.S. Pat. No. 7,551,406 (Thomas et al.), U.S. Pat. No. 7,643,250 (Araki et al.), U.S. Pat. No. 8,165,709 (Rudy), 2006/0168798 (Naka), and 2010/0208391 (Gokemeijer), wherein the entireties of said patent documents are incorporated herein by reference for all purposes.

An ELG can be formed via one or more lithography techniques. For example, an ELG can be patterned with the same formation steps (e.g., mask, lithography exposure, mill, etch, combinations of these, and the like) as a corresponding element that it is associated with (e.g., a magnetic write head). Forming an ELG at the same time as the element that it is associated with permits any variation in forming the ELG to be translated to the corresponding element. Examples of materials that ELGs are made of include a thin layer of metal such as ruthenium, chromium, nickel-iron, tantalum, combinations of these, and the like.

Magnetic write head 320 is an actual write head that is present in a subsequent slider that can write data to a magnetic media hard disk for data storage. Magnetic write head 320 can be formed out of magnetic material such as CoFe via one or more lithography techniques.

As shown in FIG. 3B, magnetic write head 320 includes a write pole region 322 and a yoke region 324. The dotted line 340 represents the target air bearing surface 340 (or physical air bearing surface) that will face a rotating disc during write operations in a hard disc drive. Target air bearing surface 340 is perpendicular to and intersects the write pole region 322. The write pole region 322 has a width dimension 325 that is parallel to the target air bearing surface 340. As also shown in FIG. 3B, magnetic write head 320 also includes yoke region 324, which has a width dimension 326 that is parallel to the target air bearing surface 340.

The magnetic write head 320 also has a break point 327 that is a distance 328 from target air bear surface 340. The break point 327 is the transition between the write pole region 322 and the yoke region 324. The break point 327 can influence to push a magnetic field through the "funnel" region of magnetic material (e.g., CoFe) that includes yoke region 324 and write pole region 322. It is noted that the break point 327 is shown as an intersection of straight lines for ease of illustration, but an actual transition from a yoke region to a write pole region can have a continuous taper. The distance 328 influences performance of the magnetic write head 320. For example, as the distance 328 decreases the magnetic field strength in write head 320 can increase. And as the distance 328 decreases, the magnetic field pole width can become more narrow.

It is noted that the width of the write pole regions shown herein is constant for ease of illustration, but the width of an actual write pole region can vary in the lapping direction. For example, the width 325 of the write pole region 322 can vary in the region illustrated by distance 328. Also in some embodiments, at one or more points at least below the target air bearing surface 340, the write pole region 322 can have width values that increase or decrease to an undue degree outside of desirable tolerances. For example, as shown in FIG. 3B, the write pole region 322 can neck in, or taper, as shown by lines 323 and 329. These perturbations can be ultimately lapped away during slider manufacture and, therefore, may not impact slider manufacture to an undue degree if they are considered appropriately. For example, as discussed below, appropriate placement of at least the electrical lead in the write pole region of the write pole test structure can avoid most (all) of these perturbations so that they do not influence the determination of write pole region width to an undue degree.

As shown in FIG. 3A, wafer 330 includes an electronic write pole test structure 310. The electronic write pole test structure 310 includes at least one reference magnetic write head 350 and a four point-probe test structure for measuring a voltage drop across the at least one reference magnetic write head 350.

As shown in FIG. 3C, reference magnetic write head 350 includes a write pole region 352 and a yoke region 354. The dotted line 340 represents the target air bearing surface 340 (or physical air bearing surface) associated with the actual magnetic write head 320 that will face a rotating disc during write operations in a hard disc drive. Reference magnetic write head 350 also includes a reference air bearing surface 360 ("electrical" air bearing surface) that is perpendicular to and intersects the write pole region 352. As shown, target air bearing surface 340 and reference air bearing surface 360 are offset from each other in the lapping direction by a distance 395. This would result in other similar features among magnetic write head 320 and reference magnetic write head 350 to be offset from each other in the lapping direction by a distance 395. For example, break point 327 and break point 357 would be offset from each other in the lapping direction by a distance 395. Accordingly, the reference magnetic write head 350 is representative of the magnetic write head 320. To facilitate this, the reference magnetic write head 350 and the magnetic write head 320 can be made using the same lithography mask(s) to pattern the reference magnetic write head 350 and the magnetic write head 320; the same etch and mills can be used; the same materials can be used (e.g., CoFe); and the same downtrack geometry write pole for formation can be used (e.g., bevel).

Alternatively, target air bearing surface 340 and reference air bearing surface 360 can be coplanar such that distance 395 is zero.

The write pole region 352 has a width dimension 355 that is parallel to the first reference air bearing surface 360. The yoke region 354 has a width dimension 356 that is parallel to the first reference air bearing surface 360.

In some embodiments, the reference magnetic write head 350 can be made at same time as magnetic write head 320 so that the reference magnetic write head 350 effectively has the same geometry and is, therefore, representative of the magnetic write head 320. In some embodiments, the reference magnetic write head 350 can also be made of the same material as magnetic write head 320.

As shown in FIGS. 3A and 3C, the write pole test stricture 310 also includes at least one pair 370 of electrical leads. The pair 370 of electrical leads includes a first electrical lead 371 and a second electrical lead 372. As shown, the first electrical lead 371 extends at least across the width dimension 356 of the yoke region 354 in the reference magnetic write head 350. The first electrical lead 371 can physically and electrically contact the yoke region 354 so that a voltage measurement can be taken (discussed below). The second electrical lead 372 extends at least across (transverse) the width dimension 355 of the write pole region 352 in the reference magnetic write head 350. The second electrical lead 372 can also physically and electrically contact the write pole region 352 so that a voltage measurement can be taken (discussed below). As shown, the second electrical lead 372 has an edge 373 that represents the first reference air bearing surface 360. The electrical leads can be made of electrically conducting material. In some embodiments, the electrical leads can be made out of metal or metal alloy such as copper, chrome, ruthenium, nickel-iron alloy, and the like. It is noted that the width of each of first electrical lead 371 and second electrical lead 372 in the "y" direction is for illustration purposes. For example, the width of each of first electrical lead 371 and second electrical lead 372 could be much wider in the "y" direction so as to contact larger areas of reference magnetic write head 350.

As shown in FIG. 3C, the reference magnetic write head 350 has a break point 357 that is a distance 358 from the reference air bear surface 360. In some embodiments, reference air bearing surface 360 can represent the target air bearing surface, an over-lapped air bearing surface, or an under-lapped air bearing surface. Accordingly, the distance 358 can be associated with either the target air bearing surface, an over-lapped air bearing surface, or an under-lapped air bearing surface. As shown, the distance 358 and reference air bear surface 360 are associated with a target (desired) air bearing surface so the first distance 328 and the second distance 358 are the same.

As shown in FIG. 3C, because the reference magnetic write head 350 and the magnetic write head 320 are made at the same time using the same lithography techniques, they both include the same necking in geometry discussed above (albeit offset in the lapping direction if desired). As shown in FIG. 3C, the write pole region 352 tapers in as shown by lines 353 and 359 in the same manner as the write pole region 322.

As described herein, a purpose of an electronic test pole structure according to the present disclosure is to infer the width 325 of the write pole region 322 in the lapping direction (y-axis) so that lapping operations can be controlled to form the target air bearing surface 340 at the desired distance 328 from the break point 327. To help do this, the electronic write pole test structure 310 includes a four point-probe test structure for measuring a voltage drop across the at least one reference magnetic write head 350 using the first electrical lead 371 and a second electrical lead 372.

As shown in FIG. 3A, the electronic write pole test structure 310 includes electrodes 364, 365, 366, and 367. The reference magnetic write head 350 is electrically coupled to electrodes 364 and 365 so that electrical current passes through the reference magnetic write head 350 (primary path) and creates a voltage drop. The first electrical lead 371 and a second electrical lead 372 are created as shown in FIG. 3C and can carry the voltage information for voltage measurement via electrodes 366 and 367. Relatively little to no current flows through the first electrical lead 371 and a second electrical lead 372 (the measurement path) so there is effectively no voltage drop and lead resistance is negligible. Accordingly, the first electrical lead 371 voltage is equal to the primary path voltage at the point where it connects to the reference magnetic write head 350. The same is true for the second electrical lead 372. Thus, the voltage drop of the primary path can be measured at precise locations. As shown in FIG. 3C, the four point probe test structure can precisely measure the voltage drop from the first electrical lead 371 to the second electrical lead 372. If the voltage drop and current are known, the resistance of that path can be calculated by dividing voltage by current. Because the reference magnetic write head 350 and the magnetic write head 320 are made at the same time using the same lithography techniques, the voltage drop from the first electrical lead 371 to the second electrical lead 372 (and corresponding resistance) in the reference magnetic write head 350 can be assumed to the same as the voltage drop (and corresponding resistance) across the same two corresponding locations in the magnetic write head 320. The resistance determined from the voltage drop across the first electrical lead 371 and the second electrical lead 372 can be used to predict (e.g., using a transfer function) the HGA electrical write-plus-erase width (WPE) as a function of the lapping direction, which can set the lapping target for an ELG. Advantageously, the write pole test structure 310 permits WPE information to be obtained at the wafer stage of slider manufacturing so that the information can be passed forward to slider lapping when the slider is lapped in the "y" direction to form the target air bearing surface 340. Undue influences by necking region 353 and 359 can be avoided.

Figure 4A:
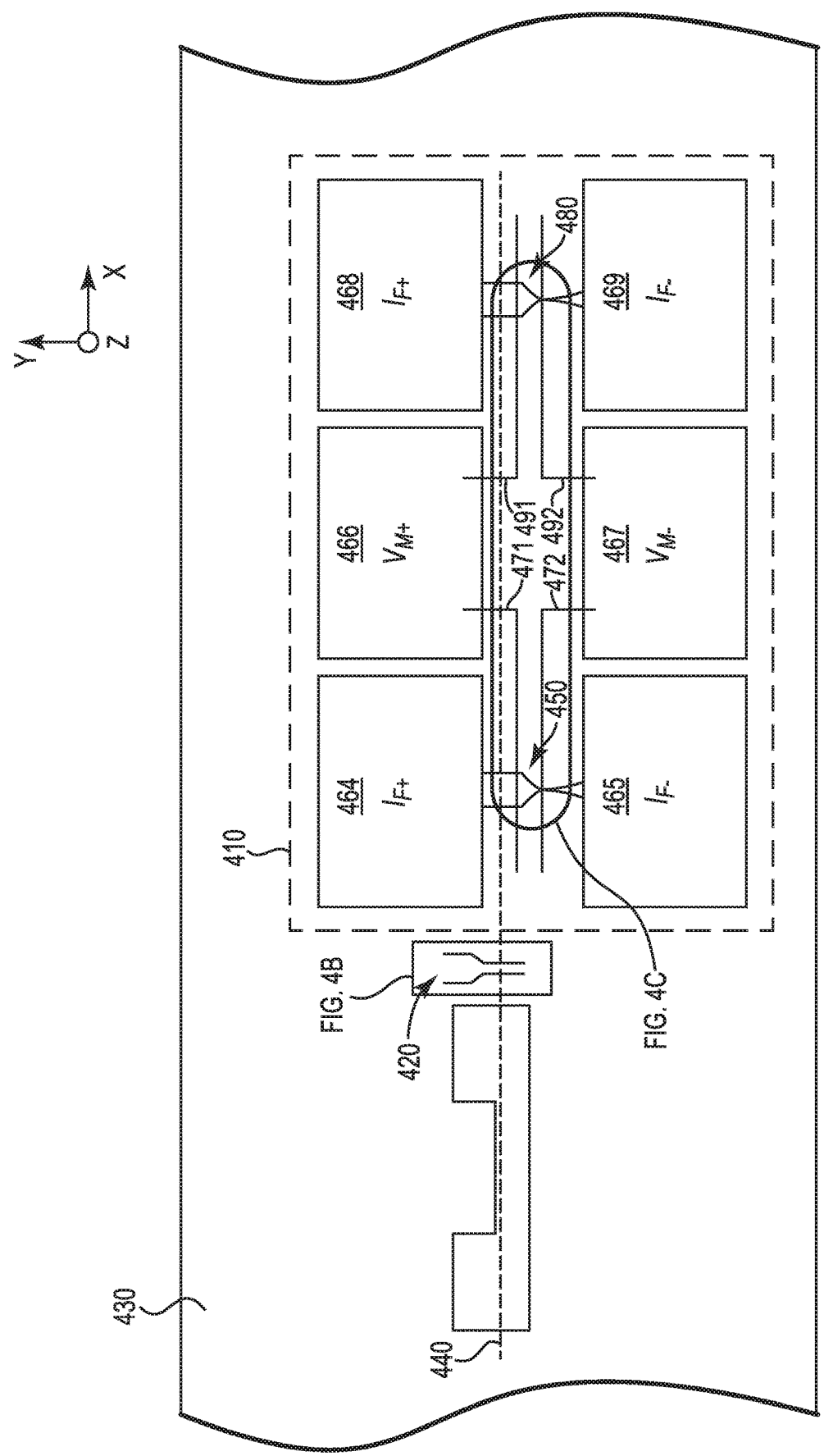
FIG. 4A is a schematic, cross-section of another embodiment of a portion of a wafer that includes an electronic write head test structure according to the present disclosure.
Figure 4C:
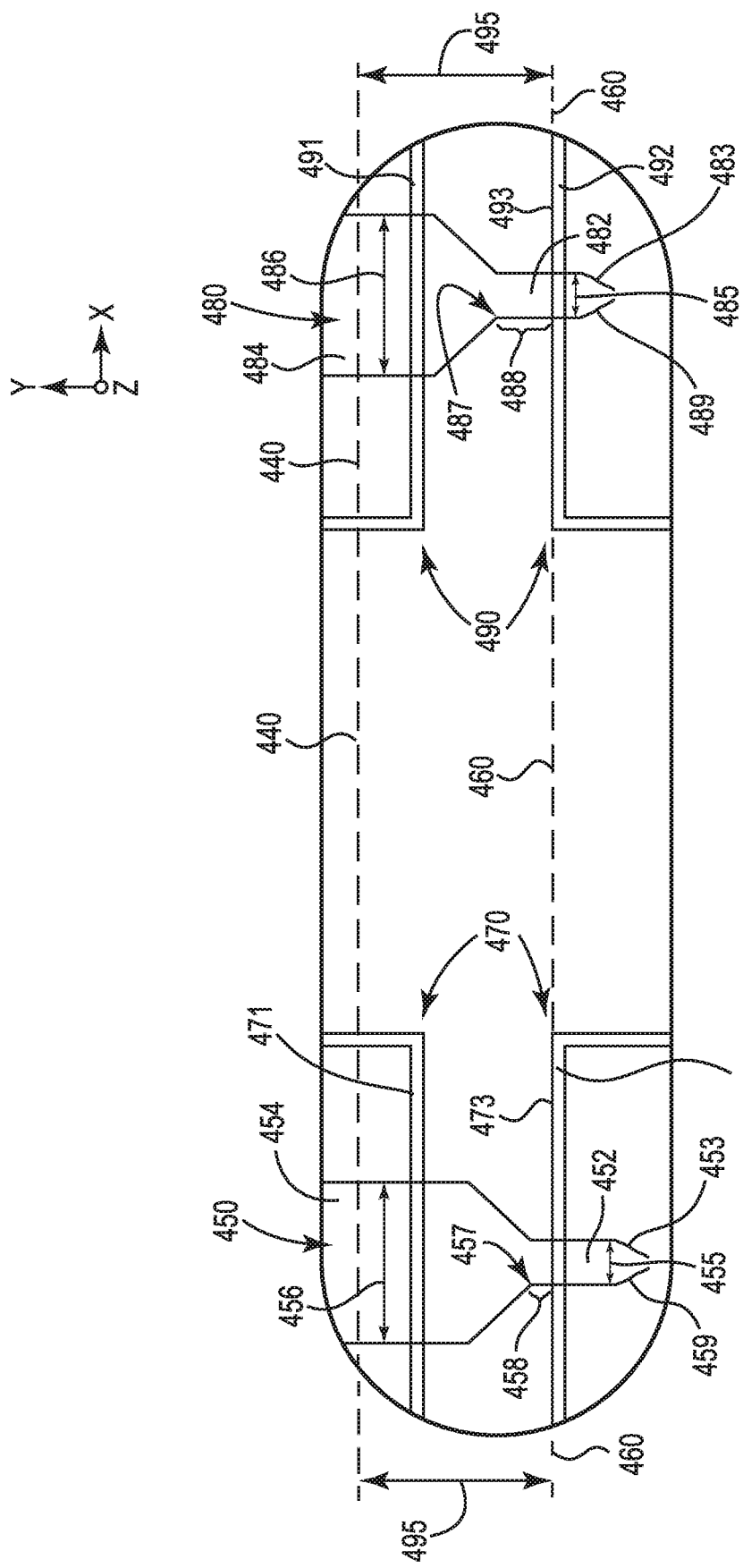
FIG. 4C is a schematic, cross-section of a portion of the embodiment shown in FIG. 4A.

FIGS. 4A, 4B, and 4C illustrate an embodiment with two reference magnetic write heads to determine write pole width information as a function of the lapping direction. The embodiment illustrated in FIGS. 4A, 4B, and 4C is substantially the same as the embodiment illustrated in FIGS. 3A-3C, except that a second reference magnetic write head is included. The features that are the same as in FIGS. 3A-3C are only briefly mentioned or omitted here.

FIGS. 4A-4C are schematic illustrations of a portion of a wafer 430 that includes a plurality of write heads 420 that will eventually be made into individual transducer heads for use in a hard disc drive. It is noted that wafer 430 can include one or more additional features associated with read/write operations such as read heads, near-field transducers, and the like. These features are omitted for illustration purposes. According to the present disclosure, at least one write head 420 is associated with at least one electronic write pole test structure 410, which can be used to determine width information about the write pole region 422 for use in subsequent lapping operation(s).

As shown in FIG. 4A, the wafer 430 includes an electronic lapping guide 440, a magnetic write head 420, and an electronic write pole test structure 410.

As shown in FIG. 4B, magnetic write head 420 includes a write pole region 422 and a yoke region 424. The dotted line 440 represents the target air bearing surface 440 (or physical air bearing surface) that will face a rotating disc during write operations in a hard disc drive. Target air bearing surface 440 is perpendicular to and intersects the write pole region 422. The write pole region 422 has a width dimension 425 that is parallel to the target air bearing surface 440. As also shown in FIG. 4B, magnetic write head 420 includes yoke region 424, which has a width dimension 426 that is parallel to the target air bearing surface 440.

The magnetic write head 420 also has a break point 427 that is a distance 428 from target air bear surface 440. The break point 427 is the transition between the write pole region 422 and the yoke region 424.

In some embodiments, the write pole region 422 can have a width (or desired range of widths) in the region illustrated by distance 428. Also in some embodiments, at one or more points at least below the target air bearing surface 440, the write pole region 422 can have one or more width values 425 that increase or decrease to an undue degree outside of desirable tolerances. For example, as shown in FIG. 4B, the write pole region 422 can neck, or taper, in as shown by lines 423 and 429. These perturbations can be ultimately lapped away during slider manufacture and, therefore, they may not impact slider manufacture to an undue degree if they are considered appropriately. For example, as discussed below, appropriate placement of at least the electrical lead in the write pole region of the write pole test structure can avoid most (all) of these perturbations so that they do not influence write pole region width to an undue degree.

As shown in FIG. 4A, wafer 430 includes a write pole test structure 410. The electronic write pole test structure 410 includes at least a first reference magnetic write head 450 and a four point-probe test structure for measuring a voltage drop across the first reference magnetic write head 450. The electronic write pole test structure 410 also includes at least a second reference magnetic write head 480 and a four point-probe test structure for measuring a voltage drop across the second reference magnetic write head 480.

As shown in FIG. 4C, first reference magnetic write head 450 includes a write pole region 452 and a yoke region 454. The dotted line 440 represents the target air bearing surface 440 (or physical air bearing surface) associated with the actual magnetic write head 420 that will face a rotating disc during write operations in a hard disc drive. Reference magnetic write head 450 also includes a reference air bearing surface 460 ("electrical" air bearing surface) that is perpendicular to and intersects the write pole region 452. As shown, target air bearing surface 440 and reference air bearing surface 460 are offset from each other in the lapping direction by a distance 495. Alternatively, target air bearing surface 440 and reference air bearing surface 460 can be coplanar. The write pole region 452 has a width dimension 455 that is parallel to the reference air bearing surface 460. The yoke region 454 has a width dimension 456 that is parallel to the reference air bearing surface 460.

As shown in FIGS. 4A and 4C, the write pole test structure 410 also includes a first pair 470 of electrical leads. The pair 470 of electrical leads includes a first electrical lead 471 and a second electrical lead 472. As shown, the first electrical lead 471 extends at least across the width dimension 456 of the yoke region 454 in the first reference magnetic write head 450. The first electrical lead 471 can physically and electrically contact the yoke region 454 so that a voltage measurement can be taken (discussed below). The second electrical lead 472 extends at least across (transverse) the width dimension 455 of the write pole region 452 in the first reference magnetic write head 450. The second electrical lead 472 can also physically and electrically contact the write pole region 452 so that a voltage measurement can be taken (discussed below). As shown, the second electrical lead 472 has an edge 473 that represents the reference air bearing surface 460.

As shown in FIG. 4C, the reference magnetic write head 450 has a break point 457 that is a distance 458 from the reference air bear surface 460. In some embodiments, reference air bearing surface 460 can represent the target air bearing surface, an over-lapped air bearing surface, or an under-lapped air bearing surface. Accordingly, the distance 458 can be associated with either the target air bearing surface, an over-lapped air bearing surface, or an under-lapped air bearing surface. As shown, the distance 458 and reference air bearing surface 460 are associated with an over-lapped condition so the distance 428 and the distance 458 are different from each other. In some embodiments, the amount of over-lap can be 20 nanometers or less, 15 nanometers or less, or even 10 nanometers or less.

As shown in FIG. 4C, second reference magnetic write head 480 includes a write pole region 482 and a yoke region 484. The dotted line 440 represents the target air bearing surface 440 (or physical air bearing surface) associated with the actual magnetic write head 420 that will face a rotating disc during write operations in a hard disc drive. Reference magnetic write head 480 also includes the reference air bearing surface 460 ("electrical" air bearing surface) that is perpendicular to and intersects the write pole region 482. As shown, target air bearing surface 440 and reference air bearing surface 460 are offset from each other in the lapping direction by the distance 495. Alternatively, target air bearing surface 440 and reference air bearing surface 460 can be coplanar. The write pole region 482 has a width dimension 485 that is parallel to the reference air bearing surface 460. The yoke region 484 has a width dimension 486 that is parallel to the reference air bearing surface 460.

As shown in FIGS. 4A and 4C, the write pole test structure 410 also includes a second pair 490 of electrical leads. The pair 490 of electrical leads includes a third electrical lead 491 and a fourth electrical lead 492. As shown, the third electrical lead 491 extends at least across the width dimension 486 of the yoke region 484 in the second reference magnetic write head 480. The third electrical lead 491 can physically and electrically contact the yoke region 484 so that a voltage measurement can be taken (discussed below). The fourth electrical lead 492 extends at least across (transverse) the width dimension 485 of the write pole region 482 in the second reference magnetic write head 480. The fourth electrical lead 492 can also physically and electrically contact the write pole region 482 so that a voltage measurement can be taken (discussed below). As shown, the fourth electrical lead 492 has an edge 493 that represents the reference air bearing surface 460.

As shown in FIG. 4C, the second reference magnetic write head 480 has a break point 487 that is a distance 488 from the reference air bear surface 460. In some embodiments, reference air bearing surface 460 can represent the target air bearing surface, an over-lapped air bearing surface, or an under-lapped air bearing surface. Accordingly, the distance 488 can be associated with either the target air bearing surface, an over-lapped air bearing surface, or an under-lapped air bearing surface. As shown, the distance 488 and reference air hear surface 460 are associated with an under-lapped condition so the distance 428, the distance 458, and the distance 488 are all different from each other. In some embodiments, the amount of under-lap can be 20 nanometers or less, 15 nanometers or less, or even 10 nanometers or less. The first reference magnetic write head 450 and second reference magnetic write head 480 share the same reference air bear surface 460 yet have different distances 458 and 488, respectively, because the first reference magnetic write head 450 and second reference magnetic write head 480 are offset from each other in the lapping direction.

In some embodiments, the first reference magnetic write head 450 and the second reference magnetic write head 480 can be made at same time as magnetic write head 420 so that the first reference magnetic write head 450 and second reference magnetic head 480 effectively have the same geometry (albeit offset in the lapping direction if desired) and are, therefore, representative of the magnetic write head 420. In some embodiments, the first reference magnetic write head 450 and second reference magnetic write head 480 can also be made of the same material as magnetic write head 420.

As shown in FIGS. 4B and 4C, if the magnetic write head 420, the first reference magnetic write head 450, and the second reference magnetic head 480 are made at the same time using the same lithography techniques, they both include the same necking in geometry. As shown in FIG. 4C, the write pole region 452 tapers in as shown by lines 453 and 459 and the write pole region 482 tapers in as shown by lines 483 and 489 in the same manner as the write pole region 422.

As shown in FIG. 4A, the electronic write pole test structure 410 includes electrodes 464, 465, 466, 467, 468, and 469. The first reference magnetic write head 450 is electrically coupled to electrodes 464 and 465 so that electrical current passes through the first reference magnetic write head 450 (primary path) and creates a voltage drop. The first electrical lead 471 and a second electrical lead 472 are created as shown in FIG. 4C and can carry the voltage information for voltage measurement via electrodes 466 and 467. Relatively little to no current flows through the first electrical lead 471 and a second electrical lead 472 (the measurement path) so there is effectively no voltage drop and lead resistance is negligible. Accordingly, the first electrical lead 471 voltage is equal to the primary path voltage at the point where it connects to the reference magnetic write head 450. The same is true for the second electrical lead 472. Thus, the voltage drop of the primary path can be measured at precise locations. As shown in FIG. 4C, a four point probe test structure can precisely measure the voltage drop from the first electrical lead 471 to the second electrical lead 472. If the voltage drop and current are known, the resistance of that path can be calculated by dividing voltage by current. Because the reference magnetic write head 450 and the magnetic write head 420 are made at the same time using the same techniques (e.g., same lithography steps, etch steps, write pole shaping patterning steps, and the like), the voltage drop from the first electrical lead 471 to the second electrical lead 472 (and corresponding resistance) in the reference magnetic write head 450 can be assumed to be the same as the voltage drop (and corresponding resistance) across the same two corresponding locations in the magnetic write head 420. Advantageously, undue influences by necking region 453 and 459 can be avoided. A voltage drop can be measured across the second reference magnetic write head 480 in a similar manner as first reference magnetic write head 450 using electrode 466, 467, 468, and 469. The "y" direction offset between first reference magnetic write head 450 and second reference magnetic write head 480 is precisely known because it is introduced as a lithography offset within mask. Thus, for magnetic write head 420 a sensitivity of write pole resistance in the "y" (lapping) direction can be obtained from the resistance values associated with distances 458 and 488. This resistance sensitivity can be used in a transfer function comparing lapping height inputs to HGA electrical write-plus-erase width (WPE) as a function of the lapping direction, which can set the lapping target for an ELG. Advantageously, the write pole test structure 410 permits WPE information to be obtained at the wafer stage of slider manufacturing so that the information can be passed forward to slider lapping when the slider is lapped in the "y" direction to form the target air bearing surface 440.

Figure 5A:
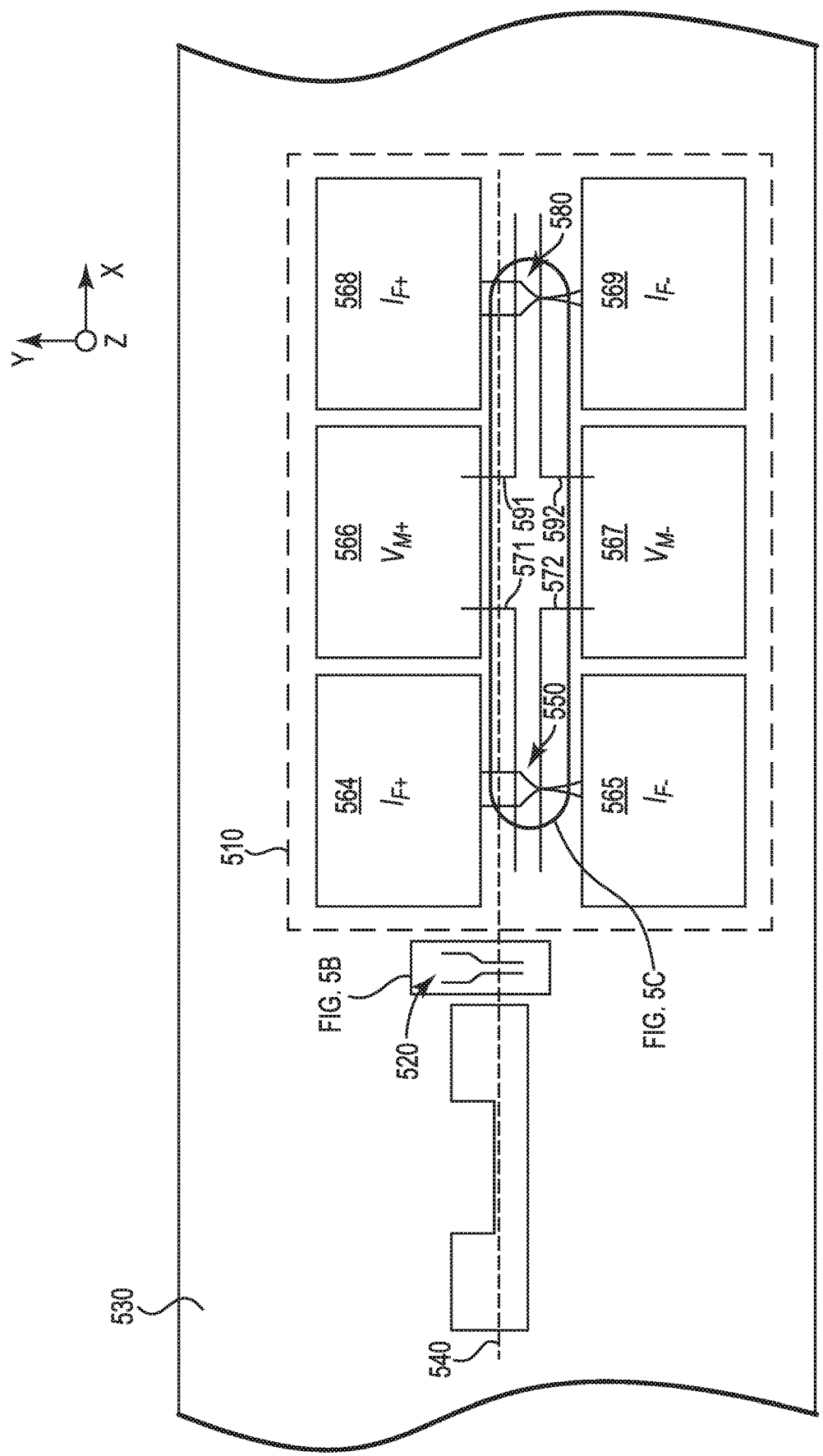
FIG. 5A is a schematic, cross-section of another embodiment of a portion of a wafer that includes an electronic write head test structure according to the present disclosure.
Figure 5C:
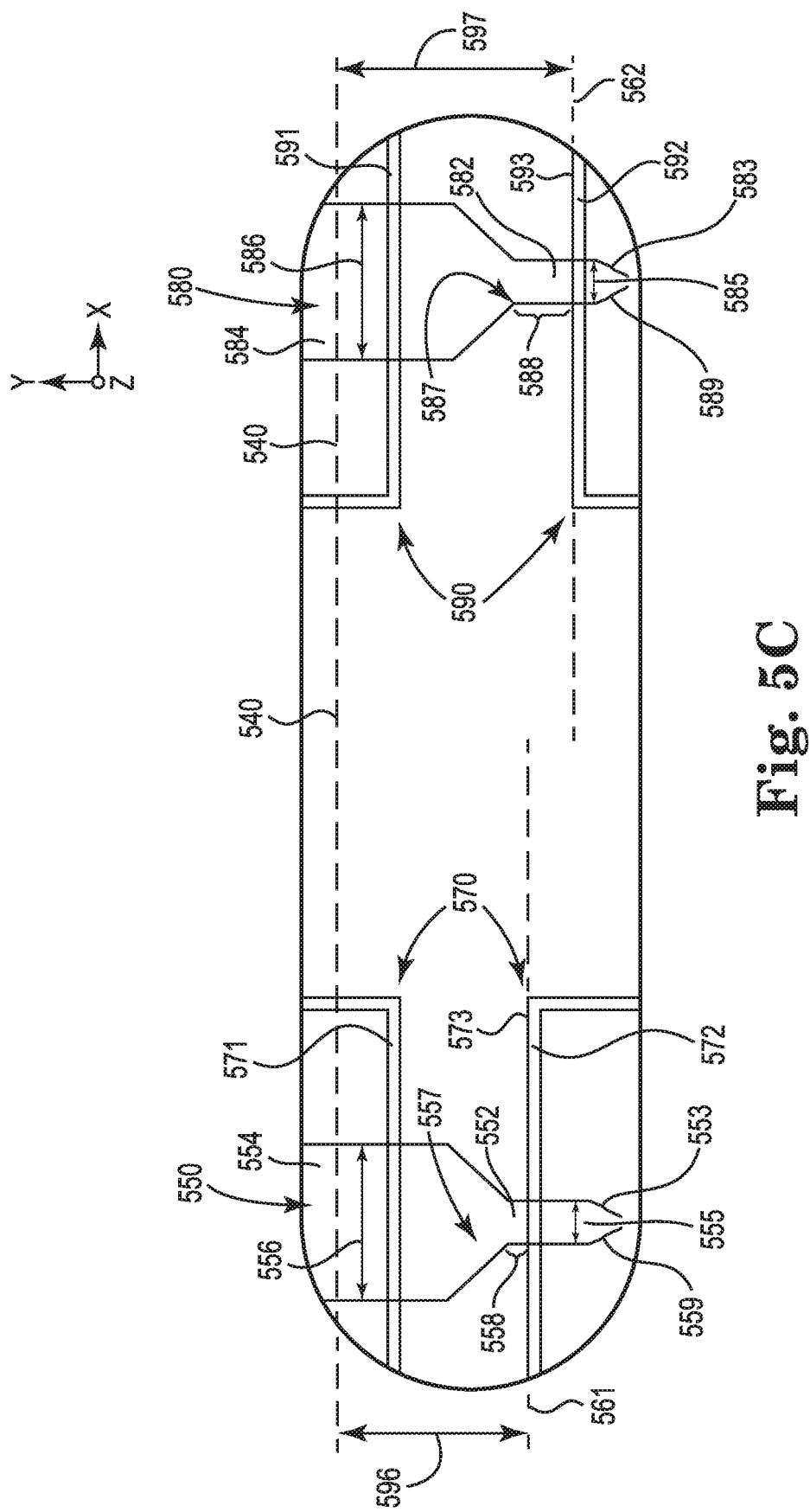
FIG. 5C is a schematic, cross-section of a portion of the embodiment shown in FIG. 5A.

FIGS. 5A, 5B, and 5C illustrate another embodiment with two reference magnetic write heads to determine write pole width information as a function of the lapping direction. The embodiment illustrated in FIGS. 5A, 5B, and 5C is substantially the same as the embodiment illustrated in FIGS. 3A-3C, except that a second reference magnetic write head is included. The features that are the same as in FIGS. 3A-3C are only briefly mentioned or omitted here.

FIGS. 5A-5C are schematic illustrations of a portion of a wafer 530 that includes a plurality of write heads 520 that will eventually be made into individual transducer heads for use in a hard disc drive. It is noted that wafer 530 can include one or more additional features associated with read/write operations such as read heads, near-field transducers, and the like. These features are omitted for illustration purposes. According to the present disclosure, at least one write head 520 is associated with at least one electronic write pole test structure 510, which can be used to determine width information about the write pole region 522 for use in subsequent lapping operation(s).

As shown in FIG. 5A, the wafer 530 includes an electronic lapping guide 540, a magnetic write head 520, and an electronic write pole test structure 510.

As shown in FIG. 5B, magnetic write head 520 includes a write pole region 522 and a yoke region 524. The dotted line 540 represents the target air bearing surface 540 (or physical air bearing surface) that will face a rotating disc during write operations in a hard disc drive. Target air bearing surface 540 is perpendicular to and intersects the write pole region 522. The write pole region 522 has a width dimension 525 that is parallel to the target air bearing surface 540. As also shown in FIG. 5B, magnetic write head 520 includes yoke region 524, which has a width dimension 526 that is parallel to the target air bearing surface 540.

The magnetic write head 520 also has a break point 527 that is a distance 528 from target air bear surface 540. The break point 527 is the transition between the write pole region 522 and the yoke region 524.

In some embodiments, the write pole region 522 can have a width (or desired range of widths) in the region illustrated by distance 528. Also in some embodiments, at one or more points at least below the target air bearing surface 540, the write pole region 522 can have widths 525 that increase or decrease to an undue degree outside of desirable tolerances. For example, as shown in FIG. 5B, the write pole region 522 can neck in, or taper, as shown by lines 523 and 529. These perturbations can be ultimately lapped away during slider manufacture and, therefore, they may not impact slider manufacture to an undue degree if they are considered appropriately. For example, as discussed below, appropriate placement of at least the electrical lead in the write pole region of the write pole test structure can avoid most (all) of these perturbations so that they do not influence measurement of write pole region width to an undue degree.

As shown in FIG. 5A, wafer 530 includes a write pole test structure 510. The electronic write pole test structure 510 includes at least a first reference magnetic write head 550 and a four point-probe test structure for measuring a voltage drop across the first reference magnetic write head 550. The electronic write pole test structure 510 also includes at least a second reference magnetic write head 580 and a four point-probe test structure for measuring a voltage drop across the second reference magnetic write head 580.

As shown in FIG. 5C, first reference magnetic write head 550 includes a write pole region 552 and a yoke region 554. The dotted line 540 represents the target air bearing surface 540 (or physical air bearing surface) associated with the actual magnetic write head 520 that will face a rotating disc during write operations in a hard disc drive. Reference magnetic write head 550 also includes a first reference air bearing surface 561 ("electrical" air bearing surface) that is perpendicular to and intersects the write pole region 552. As shown, target air bearing surface 540 and first reference air bearing surface 561 are offset from each other in the lapping direction by a distance 596. The write pole region 552 has a width dimension 555 that is parallel to the first reference air bearing surface 561. The yoke region 554 has a width dimension 556 that is parallel to the first reference air bearing surface 561.

As shown in FIGS. 5A and 5C, the write pole test structure 510 also includes a first pair 570 of electrical leads. The pair 570 of electrical leads includes a first electrical lead 571 and a second electrical lead 572. As shown, the first electrical lead 571 extends at least across the width dimension 556 of the yoke region 554 in the first reference magnetic write head 550. The first electrical lead 571 can physically and electrically contact the yoke region 554 so that a voltage measurement can be taken (discussed below). The second electrical lead 572 extends at least across (transverse) the width dimension 555 of the write pole region 552 in the first reference magnetic write head 550. The second electrical lead 572 can also physically and electrically contact the write pole region 552 so that a voltage measurement can be taken (discussed below). As shown, the second electrical lead 572 has an edge 573 that represents the first reference air bearing surface 561.

As shown in FIG. 5C, the reference magnetic write head 550 has a break point 557 that is a distance 558 from the first reference air bear surface 560. In some embodiments, reference air bearing surface 560 can represent the target air bearing surface, an over-lapped air bearing surface, or an under-lapped air bearing surface. Accordingly, the distance 558 can be associated with either the target air bearing surface, an over-lapped air bearing surface, or an under-lapped air bearing surface. As shown, the distance 558 and first reference air bear surface 561 are associated with an over-lapped condition so the distance 528 and the distance 558 are different from each other.

As shown in FIG. 5C, second reference magnetic write head 580 includes a write pole region 582 and a yoke region 584. The dotted line 540 represents the target air bearing surface 540 (or physical air bearing surface) associated with the actual magnetic write head 520 that will face a rotating disc during write operations in a hard disc drive. Reference magnetic write head 580 also includes a second reference air bearing surface 562 ("electrical" air bearing surface) that is perpendicular to and intersects the write pole region 582. As shown, target air bearing surface 540 and the second reference air bearing surface 562 are offset from each other in the lapping direction by the distance 597. The write pole region 582 has a width dimension 585 that is parallel to the second reference air bearing surface 562. The yoke region 584 has a width dimension 586 that is parallel to the second reference air bearing surface 562.

As shown in FIGS. 5A and 5C, the write pole test structure 510 also includes a second pair 590 of electrical leads. The pair 590 of electrical leads includes a third electrical lead 591 and a fourth electrical lead 592. As shown, the third electrical lead 591 extends at least across the width dimension 586 of the yoke region 584 in the second reference magnetic write head 580. The third electrical lead 591 can physically and electrically contact the yoke region 584 so that a voltage measurement can be taken (discussed below). The fourth electrical lead 592 extends at least across (transverse) the width dimension 585 of the write pole region 582 in the second reference magnetic write head 580. The fourth electrical lead 592 can also physically and electrically contact the write pole region 582 so that a voltage measurement can be taken (discussed below). As shown, the fourth electrical lead 592 has an edge 593 that represents the second reference air bearing surface 562.

As shown in FIG. 5C, the second reference magnetic write head 580 has a break point 587 that is a distance 588 from the second reference air bear surface 562. In some embodiments, second reference air bearing surface 562 can represent the target air bearing surface, an over-lapped air bearing surface, or an under-lapped air bearing surface. Accordingly, the distance 588 can be associated with either the target air bearing surface, an over-lapped air bearing surface, or an under-lapped air bearing surface. As shown, the distance 588 and the second reference air bear surface 562 are associated with an under-lapped condition so the distance 528, the distance 558, and the distance 588 are all different from each other. As shown, the breakpoint 557 of the first reference magnetic write head 550 and the breakpoint 587 of the second reference magnetic write head 580 are coplanar yet distances 458 and 488 are different from each other because the first reference air bear surface 561 and the second reference air bear surface 562 are offset from each other in the lapping direction.

In some embodiments, the first reference magnetic write head 550 and the second reference magnetic write head 580 can be made at same time as magnetic write head 520 so that the first reference magnetic write head 550 and second reference magnetic head 580 effectively have the same geometry (albeit offset in the lapping direction if desired) and are, therefore, representative of the magnetic write head 520. In some embodiments, the first reference magnetic write head 550 and second reference magnetic write head 580 can also be made of the same material as magnetic write head 520.

As shown in FIGS. 5B and 5C, if the magnetic write head 520, the first reference magnetic write head 550, and the second reference magnetic head 580 are made at the same time using the same lithography techniques, they both include the same necking in. As shown in FIG. 5C, the write pole region 552 tapers in as shown by lines 553 and 559 and the write pole region 582 tapers in as shown by lines 583 and 589 in the same manner as the write pole region 522.

As shown in FIG. 5A, the electronic write pole test structure 510 includes electrodes 564, 565, 566, 567, 568, and 569. The first reference magnetic write head 550 is electrically coupled to electrodes 564 and 565 so that electrical current passes through the first reference magnetic write head 550 (primary path) and creates a voltage drop. The first electrical lead 571 and a second electrical lead 572 are created as shown in FIG. 5C and can carry the voltage information for voltage measurement via electrodes 566 and 567. Relatively little to no current flows through the first electrical lead 571 and a second electrical lead 572 (the measurement path) so there is effectively no voltage drop and lead resistance is negligible. Accordingly, the first electrical lead 571 voltage is equal to the primary path voltage at the point where it connects to the reference magnetic write head 550. The same is true for the second electrical lead 572. Thus, the voltage drop of the primary path can be measured at precise locations. As shown in FIG. 5C, a four point probe test structure can precisely measure the voltage drop from the first electrical lead 571 to the second electrical lead 572. If the voltage drop and current are known, the resistance of that path can be calculated by dividing voltage by current. 5Because the reference magnetic write head 550 and the magnetic write head 520 are made at the same time using the same techniques (e.g., same lithography steps, etch steps, write pole shaping patterning steps, and the like), the voltage drop from the first electrical lead 571 to the second electrical lead 572 (and corresponding resistance) in the reference magnetic write head 550 can be assumed to the same as the voltage drop (and corresponding resistance) across the same two corresponding locations in the magnetic write head 520. Advantageously, undue influences by necking region 553 and 559 can be avoided. A voltage drop can be measured across the second reference magnetic write head 580 in a similar manner as first reference magnetic write head 550 using electrode 566, 567, 568, and 569. The "y" direction offset between first reference magnetic write head 550 and second reference magnetic write head 580 is precisely known because it is introduced as a lithography offset within mask. Thus, for magnetic write head 520 a sensitivity of write pole resistance in the "y" (lapping) direction can be obtained from the resistance values associated with distances 558 and 588. This resistance sensitivity can be used in a transfer function comparing lapping height inputs to HGA electrical write-plus-erase width (WPE) as a function of the lapping direction, which can set the lapping target for an ELG. Advantageously, the write pole test structure 510 permits WPE information to be obtained at the wafer stage of slider manufacturing so that the information can be passed forward to slider lapping when the slider is lapped in the "y" direction to form the target air bearing surface 540.

The write pole test structures according to the present disclosure provide one or more advantages related to lapping sliders. For example, as described above, appropriately placing electrical leads for voltage measurement (e.g., electrical lead 372) can avoid skewed measurements due to necking that may occur at locations that are relatively far below a target air bearing surface. Avoiding such skewed measurements can facilitate lapping sliders to target air bearing surface with increased accuracy. Skewed measurements could also be attributed to edge roughness in the write pole region at locations that are relatively far below a target air bearing surface.

As another example, because of the positioning of the write pole test structures (e.g., electrical leads) relative to the air bearing surface the test structure may be less likely to be damaged as the write pole region is being formed at the wafer level. Accordingly, voltage measurements can be taken at one or more points during wafer processing such as before or after bevel processing. As yet another example, using one or more write pole test structures according to the present disclosure can permit write pole region width data to be obtained as a function of lapping direction.

What is claimed is:

1. A method of forming an electronic test structure, wherein the method comprises:
    a) forming at least one magnetoresistive element on a wafer, wherein a target air bearing surface is perpendicular to and intersects the magnetoresistive element, wherein the magnetoresistive element has a width dimension that is parallel to the target air bearing surface,
    b) forming an electronic test structure on the wafer, wherein the electronic test structure comprises:
        i) at least one reference magnetoresistive element, wherein a first reference air bearing surface is perpendicular to and intersects the reference magnetoresistive element, and wherein the reference magnetoresistive element has a width dimension that is parallel to the first reference air bearing surface,
        ii) at least one pair of electrical leads, wherein the pair of electrical leads comprises a first electrical lead and a second electrical lead, wherein the first electrical lead extends at least across the width dimension of a first region in the reference magnetoresistive element, wherein the first electrical lead physically and electrically contacts the first region in the reference magnetoresistive element, wherein the second electrical lead extends at least across the width dimension of a second region in the reference magnetoresistive element, wherein the second electrical lead physically and electrically contacts the second region, and wherein the second electrical lead has an edge that represents the first reference air bearing surface;
    c) passing current through the at least one reference magnetoresistive element via a first electrode and a second electrode that are in electrical communication with the at least one reference magnetoresistive element;
    d) calculating a voltage drop based on signals from the at least one pair of electrical leads;
    e) correlating the voltage drop to the width dimension of the at least one reference magnetoresistive element; and
    f) correlating the width dimension of the at least one reference magnetoresistive element to the width dimension of the at least one magnetoresistive element.

2. A method of forming an electronic write pole test structure, wherein the method comprises:
    a) forming at least one magnetic write head on a wafer, wherein the write head comprises a write pole region and a yoke region, wherein a target air bearing surface is perpendicular to and intersects the write pole region, wherein the write pole region has a width dimension that is parallel to the target air bearing surface, and wherein the yoke region has a width dimension that is parallel to the target air bearing surface;
    b) forming an electronic write pole test structure on the wafer, wherein the electronic write pole test structure comprises:
        i) at least one reference magnetic write head, wherein the at least one reference magnetic write head comprises a write pole region and a yoke region, wherein a first reference air bearing surface is perpendicular to and intersects the write pole region, wherein the write pole region has a width dimension that is parallel to the first reference air bearing surface, and wherein the yoke region has a width dimension that is parallel to the first reference air bearing surface; and
        ii) at least one pair of electrical leads, wherein the at least one pair of electrical leads comprises a first electrical lead and a second electrical lead, wherein the first electrical lead extends at least across the width dimension of the yoke region in the reference magnetic write head, wherein the first electrical lead physically and electrically contacts the yoke region in the reference magnetic write head, wherein the second electrical lead extends at least across the width dimension of the write pole region in the reference magnetic write head, wherein the second electrical lead physically and electrically contacts the write pole region, and wherein the second electrical lead has an edge that represents the first reference air bearing surface.

3. The method of claim 2, wherein the target air bearing surface and the first reference air bearing surface are coplanar.

4. The method of claim 2, wherein the magnetic write head has a break point that is a first distance from the target air bearing surface, wherein the at least one reference magnetic write head has a break point that is a second distance from the first reference air bearing surface, wherein the magnetic write head and the at least one reference magnetic write head are formed at the same time, and wherein the first distance and the second distance are the same.

5. The method of claim 2, further comprising:
a) passing current through the at least one reference magnetic write head via a first electrode and a second electrode that are in electrical communication with the at least one reference magnetic write head;
b) calculating a voltage drop based on signals from the at least one pair of electrical leads;
d) correlating the voltage drop to the width dimension of the at least one reference magnetic write head; and
e) correlating the width dimension of the at least one reference magnetic write head to the width dimension of the at least one magnetic write head.

6. The method of claim 2, wherein the magnetic write head has a break point that is a first distance from the target air bearing surface, wherein the at least one reference magnetic write head is a first reference magnetic write head, wherein the first reference magnetic write head has a break point that is a second distance from the first reference air bearing surface and represents an over-lapped condition, wherein the at least one pair of electrical leads is a first pair of electrical leads, and wherein the electronic write pole test structure further comprises:
a) a second reference magnetic write head, wherein the second reference magnetic write head comprises a write pole region and a yoke region, wherein the first reference air bearing surface is perpendicular to and intersects the write pole region, wherein the write pole region has a width dimension that is parallel to the first reference air bearing surface, wherein the yoke region has a width dimension that is parallel to the first reference air bearing surface, and wherein the second reference magnetic write head has a break point that is a third distance from the first reference air bearing surface and represents an under-lapped condition; and
b) a second pair of electrical leads, wherein the second pair of electrical leads comprises a third electrical lead and a fourth electrical lead, wherein the third electrical lead extends at least across the width dimension of the yoke region in the second reference magnetic write head, wherein the third electrical lead physically and electrically contacts the yoke region, wherein the fourth electrical lead extends at least across the width dimension of the write pole region in the second reference magnetic write head, wherein the fourth electrical lead physically and electrically contacts the write pole region in the second reference magnetic write head, wherein the fourth electrical lead has an edge that represents the first reference air bearing surface, wherein the magnetic write head and the electronic write pole test structure are formed at the same time, and wherein the first distance, the second distance, and the third distance are different from each other.

7. The method of claim 6, further comprising:
a) passing current through the first reference magnetic write head via a first electrode and a second electrode that are in electrical communication with the first reference magnetic write head;
b) calculating a first voltage drop based on signals from the first pair of electrical leads;
c) correlating the first voltage drop to the width dimension of the write pole region of the first reference magnetic write head;
d) passing current through the second reference magnetic write head via a third electrode and a fourth electrode that are in electrical communication with the second reference magnetic write head;
e) calculating a second voltage drop based on signals from the second pair of electrical leads;
f) correlating the second voltage drop to the width dimension of the write pole region of the second reference magnetic write head; and
g) using the width dimension of the write pole region of the first reference magnetic write head and the width dimension of the write pole region of the second reference magnetic write head to generate a function of the width dimension of the write pole region of the magnetic write head at different locations in the write pole region of the magnetic write head for different lapping direction values.

8. The method of claim 2, wherein the magnetic write head has a break point that is a first distance from the target air bearing surface, wherein the at least one reference magnetic write head is a first reference magnetic write head, wherein the first reference magnetic write head has a break point that is a second distance from the first reference air bearing surface and represents an over-lapped condition, wherein the at least one pair of electrical leads is a first pair of electrical leads, and wherein the electronic write pole test structure further comprises:
a) a second reference magnetic write head, wherein the second reference magnetic write head comprises a write pole region and a yoke region, wherein a second reference air bearing surface is perpendicular to and intersects the write pole region, wherein the write pole region has a width dimension that is parallel to the second reference air bearing surface, wherein the yoke region has a width dimension that is parallel to the second reference air bearing surface, and wherein the second reference magnetic write head has a break point that is a third distance from the second reference air bearing surface and represents an under-lapped condition; and
b) a second pair of electrical leads, wherein the second pair of electrical leads comprises a third electrical lead and a fourth electrical lead, wherein the third electrical lead extends at least across the width dimension of the yoke region in the second reference magnetic write head, wherein the third electrical lead physically and electrically contacts the yoke region, wherein the fourth electrical lead extends at least across the width dimension of the write pole region in the second reference magnetic write head, wherein the fourth electrical lead physically and electrically contacts the write pole region in the second reference magnetic write head, wherein the fourth electrical lead has an edge that represents the second reference air bearing surface, wherein the magnetic write head and the electronic write pole test structure are formed at the same time, and wherein the first distance, the second distance, and the third distance are different from each other.

9. The method of claim 8, further comprising:
a) passing current through the first reference magnetic write head via a first electrode and a second electrode that are in electrical communication with the first reference magnetic write head;
b) calculating a first voltage drop based on signals from the first pair of electrical leads;
c) correlating the first voltage drop to the width dimension of the write pole region of the first reference magnetic write head;
d) passing current through the second reference magnetic write head via a third electrode and a fourth electrode that are in electrical communication with the second reference magnetic write head;
e) calculating a second voltage drop based on signals from the second pair of electrical leads;
f) correlating the second voltage drop to the width dimension of the write pole region of the second reference magnetic write head; and
g) using the width dimension of the write pole region of the first reference magnetic write head and the width dimension of the write pole region of the second reference magnetic write head to generate a function of the width dimension of the write pole region of the magnetic write head at different locations in the write pole region of the magnetic write head for different lapping direction values.

10. A wafer comprising:
a) at least one magnetic write head, wherein the write head comprises a write pole region and a yoke region, wherein a target air bearing surface is perpendicular to and intersects the write pole region, wherein the write pole region has a width dimension that is parallel to the target air bearing surface, and wherein the yoke region has a width dimension that is parallel to the target air bearing surface; and
b) an electronic write pole test structure, wherein the electronic write pole test structure comprises:
  i) at least one reference magnetic write head, wherein the at least one reference magnetic write head comprises a write pole region and a yoke region, wherein a first reference air bearing surface is perpendicular to and intersects the write pole region, wherein the write pole region has a width dimension that is parallel to the first reference air bearing surface, and wherein the yoke region has a width dimension that is parallel to the first reference air bearing surface; and
  ii) at least one pair of electrical leads, wherein the at least one pair of electrical leads comprises a first electrical lead and a second electrical lead, wherein the first electrical lead extends at least across the width dimension of the yoke region in the reference magnetic write head, wherein the first electrical lead physically and electrically contacts the yoke region in the reference magnetic write head, wherein the second electrical lead extends at least across the width dimension of the write pole region in the reference magnetic write head, wherein the second electrical lead physically and electrically contacts the write pole region, and wherein the second electrical lead has an edge that represents the first reference air bearing surface.

11. The wafer of claim 10, wherein the target air bearing surface and the first reference air bearing surface are co-planar.

12. The wafer of claim 10, wherein the magnetic write head has a break point that is a first distance from the target air bearing surface, wherein the reference magnetic write head has a break point that is a second distance from the first reference air bearing surface, and wherein the first distance and the second distance are the same.

13. The wafer of claim 10, wherein the magnetic write head has a break point that is a first distance from the target air bearing surface, wherein the at least one reference magnetic write head is a first reference magnetic write head, wherein the first reference magnetic write head has a break point that is a second distance from the first reference air bearing surface and represents an over-lapped condition, wherein the at least one pair of electrical leads is a first pair of electrical leads, and wherein the electronic write pole test structure further comprises:
a) a second reference magnetic write head, wherein the second reference magnetic write head comprises a write pole region and a yoke region, wherein the first reference air bearing surface is perpendicular to and intersects the write pole region, wherein the write pole region has a width dimension that is parallel to the first reference air bearing surface; wherein the yoke region has a width dimension that is parallel to the first reference air bearing surface, and wherein the second reference magnetic write head has a break point that is a third distance from the first reference air bearing surface and represents an under-lapped condition; and
b) a second pair of electrical leads, wherein the second pair of electrical leads comprises a third electrical lead and a fourth electrical lead, wherein the third electrical lead extends at least across the width dimension of the yoke region in the second reference magnetic write head, wherein the third electrical lead physically and electrically contacts the yoke region; wherein the fourth electrical lead extends at least across the width dimension of the write pole region in the second reference magnetic write head, wherein the fourth electrical lead physically and electrically contacts the write pole region in the second reference magnetic write head, wherein the fourth electrical lead has an edge that represents the first reference air bearing surface, wherein the magnetic write head and the electronic write pole test structure are formed at the same time, and wherein the first distance, the second distance, and the third distance are different from each other.

14. The wafer of claim 10, wherein the magnetic write head has a break point that is a first distance from the target air bearing surface, wherein the at least one reference magnetic write head is a first reference magnetic write head; wherein the first reference magnetic write head has a break point that is a second distance from the first reference air bearing surface and represents an over-lapped condition, wherein the at least one pair of electrical leads is a first pair of electrical leads, and wherein the electronic write pole test structure further comprises:
a) a second reference magnetic write head, wherein the second reference magnetic write head comprises a write pole region and a yoke region, wherein a second reference air bearing surface is perpendicular to and intersects the write pole region, wherein the write pole region has a width dimension that is parallel to the second reference air bearing surface, wherein the yoke region has a width dimension that is parallel to the second reference air bearing surface, and wherein the second reference magnetic write head has a break point that is a third distance from the second reference air bearing surface and represents an under-lapped condition; and b) a second pair of electrical leads, wherein the second pair of electrical leads comprises a third electrical lead and a fourth electrical lead, wherein the third electrical lead extends at least across the width dimension of the yoke region in the second reference magnetic write head, wherein the third electrical lead physically and electrically contacts the yoke region, wherein the fourth electrical lead extends at least across the width dimension of the write pole region in the second reference magnetic write head, wherein the fourth electrical lead physically and electrically contacts the write pole region in the second reference magnetic write head, wherein the fourth electrical lead has an edge that represents the second reference air bearing surface, and wherein the first distance, the second distance, and the third distance are different from each other.

\* \* \* \* \*